United States Patent [19]

Lance et al.

[11] 4,395,431

[45] Jul. 26, 1983

[54] PROCESSING OF HOP RESINS AND SIMILAR MATERIALS

[75] Inventors: David G. Lance, St. Andrews; Raymond N. Skinner, Greensborough, both of Australia

[73] Assignee: Carlton and United Breweries Limited, Carlton, Australia

[21] Appl. No.: 149,566

[22] Filed: May 14, 1980

[30] Foreign Application Priority Data

May 15, 1979 [AU] Australia .............................. PD8792
Jan. 22, 1980 [AU] Australia .............................. PE2085

[51] Int. Cl.$^3$ .............................................. C12C 9/02
[52] U.S. Cl. ..................................... 426/600; 426/431
[58] Field of Search ................. 426/600, 651, 16, 431, 426/428

[56] References Cited

U.S. PATENT DOCUMENTS

| | | | |
|---|---|---|---|
| 2,356,501 | 11/1942 | Brown | 426/651 X |
| 2,507,084 | 4/1948 | Ansel | 426/431 X |
| 2,816,032 | 12/1957 | Meyer | 426/431 X |
| 2,925,344 | 2/1960 | Peut | 426/651 X |
| 3,433,642 | 3/1969 | Nakayama | 426/600 |
| 3,785,858 | 1/1974 | Chapin | 427/353 X |
| 3,798,332 | 3/1974 | Westerman | 426/600 X |
| 3,881,026 | 4/1975 | Shepherd | 426/651 X |
| 3,892,808 | 7/1975 | Mikhell | 420/431 X |
| 3,955,012 | 5/1976 | Okamuron | 427/353 X |
| 4,049,834 | 9/1977 | Barwald | 426/600 X |
| 4,097,614 | 6/1978 | West | 426/600 X |
| 4,216,269 | 8/1980 | Tonali | 427/353 X |
| 4,218,491 | 8/1980 | Laws | 426/600 |

FOREIGN PATENT DOCUMENTS

| | | |
|---|---|---|
| 274051 | 3/1965 | Australia . |
| 434178 | 2/1973 | Australia . |
| 29566 | 10/1977 | Australia . |
| 2833588 | 3/1979 | Fed. Rep. of Germany ...... 426/600 |

*Primary Examiner*—Hiram H. Bernstein
*Attorney, Agent, or Firm*—Finnegan, Henderson, Farabow, Garrett & Dunner

[57] ABSTRACT

A method for the solvent-free processing and/or handling of a complex organic mixture, characterized in that the mixture is coated on to an inert hydrophobic support prior to such processing or handling. Also included is a method for separating a two-phase system having a phase comprising a complex organic mixture and an aqueous phase by contact with an inert hydrophobic support.

The invention is particularly concerned with the treatment of complex materials of a resinous nature, especially those of plant origin and, specifically, hop resins.

The invention further includes a method for the selective extraction of hop resin components wherein a hop resin extract is coated onto an inert hydrophobic support, from which components of the resin can be selectively extracted.

7 Claims, No Drawings

PROCESSING OF HOP RESINS AND SIMILAR MATERIALS

This invention is concerned with novel methods for the processing and handling of complex organic mixtures and to the use of inert supports in such methods. The invention is particularly concerned with the treatment of complex materials of a resinous nature, especially those of plant origin and, specifically, hop resins.

The hop constituent of importance in brewing is the hop resin, which contains, inter alia, the $\alpha$- and $\beta$-acids. When hops are added to the boiling wort during beer production, various complex chemical changes occur in the constituents of the hop resin, resulting in the formation of soluble bitter substances. The most notable of these transformations is the conversion of $\alpha$-acids to the bitter iso-$\alpha$-acids, which are found in solution following boiling of hops. These are retained to a greater or lesser degree during subsequent processing stages and appear in the final beer, where they impart to a large degree, the bitter flavour of beer.

To avoid continual handling of large quantities of bulky hops, and to improve the storage characteristics and efficiency of usage of the hop resins, hops are often extracted using organic solvents. The extracted resin is then recovered by evaporation of the solvent, and the resulting hop extract used in place of hops in the boiling kettle. It has been suggested that the efficiency of utilisation of this resin may be improved if it is first coated onto an inert support, such as finely divided spent hops (mainly cellulose) or conventional mineral absorbents (e.g., diatomaceous earth) by deposition from solution in the extracting solvent. The more efficient utilisation of the resin so coated is presumably due to the greater degree of dispersion which can be achieved, compared with the original semifluid resin.

In attempts to further improve the efficiency of utilisation of hop resin, many processes have been developed for the production of so-called "isomerised hop extracts", wherein the $\alpha$-acids are separated from solutions of hop resin, isomerised in high yield to iso-$\alpha$-acids in a carefully controlled chemical environment, then added to the beer at a stage late in processing wherein losses are greatly reduced. Such a procedure can result in a significant improvement in utilisation of the hop resin.

For example, preparation of isomerised hop extracts is described in our Australian Pat. No. 274,051 and No. 434,178. The methods described in these patents include the separation of the $\alpha$-acids from the other hop resin components, prior to isomerisation to iso-$\alpha$-acids, and where the solvent is water-immiscible, may involve, for example, a countercurrent liquid-liquid extraction of the primary organic solvent extract with an aqueous solution of an inorganic alkali such as sodium or potassium carbonate.

In cases where the organic solvent used for hop extraction is water-miscible, a typical procedure is to remove the water-miscible organic solvent, e.g., by evaporation, and dissolve the extract or a portion thereof in a water-immiscible organic solvent for subsequent $\alpha$-acids recovery by the method outlined above.

The prior art contains numerous accounts of chromatographic processes which involve the use of organic solvents and which, to some extent allow separation of $\alpha$- and/or $\beta$-acids from hop extracts. U.S. Pat. No. 3,433,642 refers to many of these processes and describes in detail a process of frontal chromatographic separation whereby the humulone content of a solvent-based hop resin extract is selectively retained on a column of an "inert alkaline granular adsorbent", while the other resin components pass out of the column.

All of these chromatographic processes involve the use of organic solvents.

Recently, concern has developed regarding the health aspects of residues of certain organic solvents in hop extract resulting from their use as hop-extracting solvents. In order to obviate any problem in this regard, extraction processes have been developed which use liquid carbon dioxide as a solvent and thus give hop extracts which are totally free of organic solvent. One such process is described in German patent specification DE-OS No. 27 45 829.

In such a process, however, where the solvent used is a gas under normal atmospheric conditions (and in other processes where a solvent-free extract is obtained) and it is not considered desirable to redissolve the resin extract in an organic solvent for further processing, e.g., isomerisation, new means of processing, which do not involve the use of organic solvents, are required. One possibility is to process such resin extracts using only aqueous phases for dispersions or solutions, but it is found in practice that hop resin and its individual constituents have a very low solubility in water at neutral or acid pH, are very difficult to disperse in aqueous phases, and tend to adhere as large masses on the surfaces of processing equipment, e.g., vessels and stirrers. Even when solutions have been produced, processes which involve a pH change may result in the separation from solution of one or more of the individual resin constituents or their transformation products. Such products then present similar handling problems to those described above, and are difficult to remove from suspension.

We have investigated the direct alkaline extraction of $\alpha$-acids from solvent-free hop extract resins but the problems of handling and treating the resins make such a process unworkable in practical terms.

One of the objects of the present invention, therefore, is to provide a process whereby a hop resin extract, however prepared can be converted to a dispersed stable form which can be handled without difficulty and may be used for further processing, without involving the use of organic solvents.

During our investigations of hop resin treatment processes, we have studied the use of inert solid supports for the resin phase. Whilst it was found that the traditional supports such as diatomaceous earth could be used to a limited extent if the resin was first coated onto them from solution, e.g., in liquid carbon dioxide, these materials did not coat with the resin satisfactorily when added to resin-aqueous two-phase systems. Thus diatomaceous earth, cellulose powder and silica gel were found to be unsatisfactory as inert supports when added to two phase systems of the type in question.

The present invention is based upon our surprising discovery that certain hydrophobic materials, for example, many synthetic polymeric materials, may advantageously be used as inert supports or filter-aids in hop resin treating processes. These hydrophobic materials have the ability to take up hop resin from aqueous suspension to produce a suspension of the resin-coated support dispersed in the aqueous phase. Such a suspension is readily stirred without showing any tendency to stick to the vessel or stirrer; it may be pumped, filtered, or otherwise handled without difficulty and may be used in further processing of the resin, without removal of the latter from the support.

This discovery allows a whole new approach to the processing and handling of hop resin or other complex organic mixtures.

According to the present invention, there is provided a method for the solvent-free processing and/or handling of a complex organic mixture, which comprises the step of coating the mixture on to an inert hydrophobic support prior to such processing or handling.

The invention is particularly concerned with the treatment of complex materials which are resinous in nature, especially those of plant origin.

The invention has particular and specific application to the processing of hop resins.

The preferred aspects of this invention relate to the handling and treatment of hop resin extracts prepared by extraction of hops with liquid $CO_2$, and from which the $CO_2$ has been removed. However, resin extracts prepared by any other known methods can also be used.

The invention will therefore be further defined and elucidated in the following description with particular reference to hop resin processing.

The invention also provides in one aspect, a hop resin product comprising an inert hydrophobic support having hop resin coated thereon.

The preferred supports are inert synthetic polymers, for example polyalkylenes such as polyethylene; halogenated, hydrocarbon polymers such as polytetrafluoroethylene ("Teflon"); vinyl polymers and co-polymers, such as ethylene-vinyl acetate copolymers and polyvinylpyrrolidone, and polyamides, such as Nylon.

The term "inert", as applied to the support means that the support does not react chemically with components of the resin extract or extracting system. Furthermore, the support, when used in a food processing environment, should also be inert in the sense that it should not contain or give rise to substances which are unacceptable in food processing or in a food product.

The exact nature of the resin coating and the method of its formation are not known but it is presumed that the resin coats onto the surface of the support as a film.

The preferred form of the support is thus a fine powder, whereby the large surface area so obtained allows the useable resin content to be sufficiently high that excessive quantities of the support are not required. For certain applications, however, the support may be in the form of relatively large particles, extended bodies such as strips or sheets of film, or even solid or hollow geometrical bodies such as rods, or spheres.

The use of the resin coated supports of the invention may be illustrated by reference to another aspect of the invention, which provides a method for the selective extraction of hop resin components, wherein a hop resin extract is coated onto the inert support, from which components of the resin can be selectively recovered.

Recovery can be effected by any suitable procedure, for example by batchwise extraction in a stirred tank or, preferably, by extraction of the dispersed solid phase in a column, with a continuous phase of aqueous alkali, e.g., sodium or potassium carbonate. We have found with such an extraction technique that the $\alpha$-acids are selectively extracted into the aqueous alkali phase and are then substantially free of $\beta$-acids or other resin components which remain on the support. The recovered $\alpha$-acids are then in a form which can be used in brewing or can be processed through to iso-$\alpha$-acids by any of a number of known methods, e.g., alkali isomerisation, catalytic isomerisation, photoisomerisation or isomeration as the insoluble calcium or magnesium salt.

After recovery of the $\alpha$-acids, the $\beta$-acids may then be selectively recovered, if desired, by further extraction of resin coated support with aqueous alkali.

Alternatively, the resin while still coated on the support can be reacted with alkaline earth oxides or hydroxides with subsequent isomerisation, or with metallic hydrides to produce a reduced isomerised product.

The residual hop resins (including the $\beta$-acids if not recovered separately) can then be recovered without use of organic solvents by stripping the inert support with liquid $CO_2$, or with aqueous alkali, e.g., sodium or potassium hydroxide. Other solvents acceptable in food processing, such as ethanol, may also be used for this stripping operation. Alternatively, the residual hop resins can be left on the inert support and stored or used in this form.

The following description illustrates a typical hop extract separation process in accordance with the invention. The inert support, e.g., powdered high density polyethylene, is dispersed in water at a temperature in the range of 30°–100° C. but preferably 40°–50° C. The resin extract is liquefied if necessary, by heating and then metered, e.g., by pump or gravity feed, into the water phase with agitation. Agitation is continued until coating of the resin on the solid support is complete, typically 15–30 minutes at 50° C. Resin can be effectively coated on the support at any ratio of resin to support up to 1:1 but preferably 0.1:1 to 0.2:1. The dispersion can then be cooled and the solid dispersed phase recovered by filtration or centrifugation and either stored wet or dried.

Alternatively the aqueous slurry of resin-coated powder can be packed into a column or series of columns by pumping or other means in preparation for recovery of the $\alpha$-acids or transferred to a stirred tank system for the same purpose.

When using columns, the $\alpha$-acids can be selectively recovered by passing an aqueous solution of an alkali salt, e.g., sodium or potassium carbonate through the column or series of columns packed with the resin-coated powder in the manner described above.

The concentration of $\alpha$-acids in the exit stream from the columns can be controlled by controlling the normality of the alkali salt used for extraction, e.g., with sodium or potassium carbonate, at a molarity of 0.038, a concentration of $\alpha$-acids in the aqueous extract of 1.0–1.3% w/v can be achieved.

The selectivity of extraction of the $\alpha$-acids can be controlled by selecting a cut-off pH for the aqueous extract emerging from the column, or the last column in a series of columns, which extract is collected for $\alpha$-acids recovery. For example, it has been found that by collecting the extract up to an exit pH of 8.3–8.5 a lupulone concentration in the extract of no greater than 2% of that of the $\alpha$-acids can be maintained while achieving an extraction efficiency of the $\alpha$-acids of greater than 99%.

A significant advantage of this process is that the $\alpha$-acids can be recovered at a lower pH than previously used, hence limiting the possibility of degradation, and in a purer form than previously with respect to admixture with other hop resin components.

An additional advantage is that subsequent to $\alpha$-acids recovery, the $\beta$-acids may be removed from the support by passage of further aqueous alkali and presented in a form suitable for further processing, e.g., oxidation to hulupones.

In fact, the process of the invention may be used to achieve a selective fractionation of the hop resin components on the basis of pKa values. It can also be applied to the fractionation of an isomerised hop resin extract.

The present invention also extends to the use of the inert support as a filter-aid for separation of the resin component from a resin-aqueous two phase system. In this aspect the invention provides a method for separating a hop resin-aqueous two-phase system which comprises contacting the system with an inert hydrophobic support to thereby coat the resin phase onto the support and, if desired, separating the resin coated support from the aqueous phase.

Furthermore, inert supports coated with hop resin, or constituents or derivatives thereof are new and useful products in their own right. Thus, for example, we have found that Nylon powder coated with hop extract prepared under conditions which preserve the quality of the essential oil components may be used as a substitute for hops for "dry hopping" of beer. This term refers to the addition of whole hops to beer just prior to final filtration in order to impart an increased "hop character" to the beer.

The following example illustrates the invention, but should not be taken as limiting thereon:

EXAMPLE 1

Preparation of hop resin-coated support

A resin extract of hops prepared by liquid $CO_2$ extraction of hops was warmed to 40° C. and then added gradually to an agitated mixture of high density polyethylene powder in water at 50° C. The amount of resin added was such as to give a 20% w/w coating of resin on polyethylene. Agitation was continued for 15 minutes at 40°–50° C. The slurry was then used as such, or filtered to separate the coated resin, for subsequent processing.

EXAMPLE 2

Use of hop resin-coated support for preparation of an isomerised extract

A suspension of hop resin-coated polyethylene powder, prepared as in Example 1, in water was stirred with magnesium oxide equimolar with respect to the $\alpha$-acids present. The mixture was then heated at 100° C. for 30 minutes. After cooling, the solid phase was filtered off. The resin was recovered from the support by trituration with alcohol and examined for the presence of $\alpha$-acids and iso-$\alpha$-acids. Only the latter was detected, showing that the $\alpha$-acids constituents of the resin had undergone conversion into the corresponding iso-$\alpha$-acids.

EXAMPLE 3

Preparation of hop resin-coated support and extraction and isomerisation of $\alpha$-acids.

A resin extract of hops prepared by liquid $CO_2$ extraction of hops was warmed to 40° C. and then added gradually to an agitated mixture of high density polyethylene powder in water at 50° C. The amount of resin added was such as to give a 20% w/w coating of resin on polyethylene. Agitation was continued for 15 minutes at 40°–50° C. The slurry was then transferred by pumping into a vertical column fitted with a fine mesh at either end to retain the polymer within the column.

An aqueous solution of sodium carbonate (0.038 M) was passed through the column in an upward direction and the material exiting the column collected until the exit pH reached 8.3. At this stage the outlet of this column was connected in series to the inlet of a freshly packed column. When the pH of the exit stream from the two column couple reached 8.3–8.5, the first column was disconnected and the aqueous carbonate was fed to the inlet of the second column. A third freshly packed column was connected in series with this second column and alkali extraction continued. This procedure was repeated to process the desired quantity of resin extract. The aqueous carbonate extract emerging from the columns contained $\alpha$-acids (1.2% w/v) and $\beta$-acids (0.02% w/v). The residual $\alpha$-acids present in any column disconnected from a column couple (at the stage when the pH of the extract leaving the second column in that couple was 8.3–8.5) was less than 1% of the $\alpha$-acids initially packed into that column.

To a volume of the aqueous extract so obtained was added two molar-equivalents (with respect to $\alpha$-acids) of magnesium sulphate. The resulting precipitate, which contained more than 95% of the $\alpha$-acids originally present in the solution in the form of their insoluble magnesium salts was recovered by filtration. The resulting wet solid was heated in a closed container at 90° C. for two hours to give a toffee-like solid which separated from the aqueous phase and hardened on cooling to give a grindable solid containing the iso-$\alpha$-acids (90% conversion) as the magnesium salts.

EXAMPLE 4

Use of an hydrophobic support as a filter aid

A solution containing the potassium salts of iso-$\alpha$-acids and $\beta$-acids was adjusted to pH 5, whereupon an emulsion of $\beta$-acids as the free resin was immediately formed. This emulsion was stirred with Nylon powder for 30 minutes and was then filtered. The filtration proceeded rapidly resulting in a clear aqueous solution of the potassium salt of iso-$\alpha$-acids.

Applications of the general principles of the invention, other than those described above, will be obvious to those skilled in the art.

The use of polyethylene and Nylon as shown in the examples is in no way limiting.

Among the common materials used traditionally in this type of application the following were not satisfactory supports for hop resins when added to resin-aqueous two phase systems: cellulose powder, diatomaceous earth, silica gel.

By comparision, the following materials have been tested and found satisfactory for use according to the present invention: Teflon, polyethylene, ethyl vinyl acetate, Nylon, polyvinylpyrrolidone.

Obviously may other polymeric materials exist which would be equally satisfactory. The important characteristic is the hydrophobic nature of their surfaces.

Similarly, it will be evident there are many other complex organic mixtures, especially those involving resinous materials, to which the principle of this invention can be applied.

We claim:

1. A method for producing a hop resin product comprising the steps of:

contacting an inert hydrophobic support with a solvent-free two phase system comprising a hop resin extract and an aqueous phase to effect coating of said resin onto said support, and separating the resin-coated support from said system.

2. A method for the selective extraction of hop resin components comprising the steps of:

contacting an inert hydrophobic support with a solvent-free two-phase system comprising a hop resin extract and an aqueous phase to effect coating of said resin onto said support and selectively extracting components of said resin from said inert hydrophobic support.

3. A method as claimed in claim 2, characterised in that the resin-coated support is contacted with an aqueous solution of an alkali salt at a suitable pH to thereby selectively extract the α-acids.

4. A method as claimed in claim 3, characterised in that after extraction of the α-acids, the β-acids are extracted by contact of the coated support with aqueous alkali at a suitable pH.

5. A method as claimed in claim 2 or claim 3, characterised in that the resin-coated support is contained in one or more columns through which the alkaline solution is passed to effect the extraction.

6. A method as claimed in claim 2, characterised in that prior to extraction the resin while on the support is reacted with a suspension of an alkaline earth oxide or hydroxide to thereby isomerize the α-acids in the resin.

7. A method as claimed in claim 2, characterised in that prior to extraction the resin while coated on the support is heated in the presence of a metallic hydride to isomerise and reduce the α-acids.

* * * * *